United States Patent
Fujimoto et al.

(10) Patent No.: US 7,990,682 B2
(45) Date of Patent: Aug. 2, 2011

(54) ANODE ELEMENT, METHOD OF MANUFACTURING THE SAME, AND SOLID ELECTROLYTIC CAPACITOR

(75) Inventors: Kazumasa Fujimoto, Saga-gun (JP); Yukio Takeda, Saitama (JP)

(73) Assignees: Sanyo Electric Co., Ltd., Moriguchi-shi (JP); Saga Sanyo Industries Co., Ltd., Saga (JP); Japan Capacitor Industrial Co., Ltd., Tokyo (JP)

( * ) Notice: Subject to any disclaimer, the term of this patent is extended or adjusted under 35 U.S.C. 154(b) by 303 days.

(21) Appl. No.: 11/702,584

(22) Filed: Feb. 6, 2007

(65) Prior Publication Data

US 2007/0183120 A1 Aug. 9, 2007

(30) Foreign Application Priority Data

Feb. 9, 2006 (JP) ................................. 2006-032740

(51) Int. Cl.
*H01G 4/06* (2006.01)
*H01G 5/013* (2006.01)
*H01G 9/00* (2006.01)
*H01G 9/04* (2006.01)
*H01G 9/145* (2006.01)

(52) U.S. Cl. ..................... 361/524; 361/528; 29/25.03

(58) Field of Classification Search .................. 361/523, 361/524, 528, 532
See application file for complete search history.

(56) References Cited

U.S. PATENT DOCUMENTS

| | | | |
|---|---|---|---|
| 4,437,946 A | | 3/1984 | Bernard |
| 4,936,957 A | * | 6/1990 | Dickey et al. ............... 205/96 |
| 5,729,428 A | | 3/1998 | Sakata et al. |
| 7,411,779 B2 | * | 8/2008 | Merker et al. ............. 361/523 |
| 2001/0048583 A1 | * | 12/2001 | Nakada et al. ............ 361/509 |
| 2002/0195683 A1 | * | 12/2002 | Kim et al. .................. 257/532 |
| 2003/0107109 A1 | * | 6/2003 | Curro et al. ............... 257/632 |

(Continued)

FOREIGN PATENT DOCUMENTS

DE 3800641 A * 7/1989

(Continued)

OTHER PUBLICATIONS

Jerry Whitaker, The Electronics Handbook, 2005, CRC Press, Second edition, p. 190.*

(Continued)

*Primary Examiner* — Eric Thomas
*Assistant Examiner* — David M Sinclair
(74) *Attorney, Agent, or Firm* — Westerman, Hattori, Daniels & Adrian, LLP

(57) ABSTRACT

An anode element of a solid electrolytic capacitor and a method of fabricating the anode element are improved, so that the step of manufacturing the solid electrolytic capacitor is simplified, reliability is improved, and a withstand voltage of the solid electrolytic capacitor is increased. An anode element including a metal and a coating layer formed on a surface thereof, the coating layer being composed of a hydrated oxide shown as $MO_x \cdot yH_2O$ in chemical formula (1), where M represents a valve metal and x and y represent an integer or a decimal fraction from 1 to 6, a hydroxide shown as $M(OH)_n$ in chemical formula (2), where M represents a valve metal and n represents an integer or a decimal fraction from 1 to 6, or a composite thereof, a method of manufacturing the anode element, and a solid electrolytic capacitor employing the anode element are provided.

14 Claims, 4 Drawing Sheets

U.S. PATENT DOCUMENTS

| | | | |
|---|---|---|---|
| 2004/0053020 A1 * | 3/2004 | Mashiko et al. | 428/209 |
| 2005/0084739 A1 * | 4/2005 | Swider-Lyons et al. | 429/40 |
| 2007/0110990 A1 * | 5/2007 | Carlson | 428/312.2 |

FOREIGN PATENT DOCUMENTS

| | | | |
|---|---|---|---|
| GB | 1451887 A | | 10/1976 |
| JP | 53068864 A | * | 6/1978 |
| JP | 60-157215 A | | 8/1985 |
| JP | 60169131 A | * | 9/1985 |
| JP | 01232712 A | * | 9/1989 |
| JP | 02-298012 A | | 12/1990 |
| JP | 03200315 A | * | 9/1991 |
| JP | 08-064481 A | | 3/1996 |
| JP | 8-241832 A | | 9/1996 |
| JP | 8-293436 A | | 11/1996 |
| JP | 11-74155 A | | 3/1999 |
| JP | 11-329900 A | | 11/1999 |
| JP | 2002222742 A | * | 8/2002 |

OTHER PUBLICATIONS

Chinese Office Action dated Mar. 3, 2010, issued in corresponding Chinese Patent Application No. 2007-10005204 (With English Language Translation).

Japanese Office Action dated Oct. 5, 2010 issued in correspondig Japanese Patent Application No. 2006-032740.

* cited by examiner

ANODE ELEMENT, METHOD OF MANUFACTURING THE SAME, AND SOLID ELECTROLYTIC CAPACITOR

BACKGROUND OF THE INVENTION

1. Field of the Invention

The present invention relates to an anode element with improved performance, a method of manufacturing the same, and a solid electrolytic capacitor having an improved withstand voltage by utilizing the anode element.

2. Description of the Background Art

Generally, an anode element obtained by coating a surface of a metal with an anodic oxide film is used as an anode element of a solid electrolytic capacitor. This is because the solid electrolytic capacitor employing the anodic oxide film as a dielectric is relatively inexpensive and its capacity is great. Examples of the solid electrolytic capacitor widely used in present days include a wound-type structure (see Japanese Patent Laying-Open No. 11-074155), a single-plate-type structure (see Japanese Patent Laying-Open No. 11-329900), and the like. The anodic oxide film is normally formed by subjecting the metal to formation treatment using anodic oxidation. The anodic oxide film is mainly composed of an oxide of the metal.

A withstand voltage of the solid electrolytic capacitor is considered to be dependent on a thickness of the anodic oxide film, and it is considered necessary to form an anodic oxide film having a large thickness in order to increase the withstand voltage. Accordingly, a formation voltage in formation treatment using anodic oxidation described above is applied in proportion to the withstand voltage of the solid electrolytic capacitor. More specifically, the formation voltage is set to magnitude two to three times as great as the withstand voltage of the solid electrolytic capacitor so as to form the anodic oxide film. Here, for example, EIAJ RC-2364A (Japan Electronics and Information Technology Industries Association Standards (revised March, 1999)) is available as a method of measuring a withstand voltage of the anodic oxide film. In the following, the withstand voltage of the dielectric on the surface of the metal in accordance with EIAJ RC-2364A is referred to as a Vt withstand voltage.

The anodic oxide film is formed, for example, through anodic oxidation by applying a formation voltage to the metal while the metal is immersed in an aqueous solution containing ammonium adipate. Generally, it is considered that close attention should be paid for forming a uniform anodic oxide film on the entire metal surface, without forming a porous film. Namely, the anodic oxide film is of a barrier-type, that is, the surface of the metal is completely coated to a uniform thickness. This is because the anodic oxide film of the barrier-type attains a Vt withstand voltage higher than a porous anodic oxide film on the condition that the anodic oxide film of the barrier-type and the porous anodic oxide film are identical in the thickness.

In addition, it is considered that a leakage current of the solid electrolytic capacitor and a leakage current in liquid during the anodic oxidation step in forming the anodic oxide film in the solid electrolytic capacitor correlate with each other. Therefore, in order to prevent the leakage current in liquid in anodic oxidation described above, complicated fabrication steps such as heat treatment before or during anodic oxidation have been adopted. Even if the Vt withstand voltage is increased by adopting the method above, however, the withstand voltage of the solid electrolytic capacitor is not raised as expected. Namely, large electric power is consumed for obtaining a desired withstand voltage of the solid electrolytic capacitor.

In addition, if the anode element is cut and worked to form the solid electrolytic capacitor, burdensome steps such as anodic oxidation, washing, drying, and the like are required for formation re-treatment for repairing an end face of the cut edge. Further, even if repairing as such is performed, the Vt withstand voltage of the repaired anodic oxide film cannot be equivalent to the Vt withstand voltage of the anodic oxide film before cutting and working. Such non-uniformity of the repaired anodic oxide film becomes a factor leading to deterioration of the withstand voltage of the solid electrolytic capacitor, higher leakage current, and resultant lower reliability of the solid electrolytic capacitor. In addition, if a voltage equal to or greater than the formation voltage used for forming the anodic oxide film in fabricating the anode element before cutting and working is applied at the time of formation re-treatment, the anodic oxide film is broken. Therefore, such application of voltage not smaller than the Vt withstand voltage at the time of formation re-treatment has conventionally been avoided. In particular, if the solid electrolytic capacitor is of the wound-type, damage to the anodic oxide film due to winding of the anode element is greater as the withstand voltage of the solid electrolytic capacitor is greater, and reaction takes place in a gap where liquid circulation is insufficient in the formation re-treatment, which results in the problem of corrosion of the anode element, corrosion of a lead due to generated air bubbles, or the like.

Here, from a viewpoint of increasing capacitance of the solid electrolytic capacitor by improving a method of forming an anodic oxide film, a method allowing increase in capacitance even with a withstand voltage of the solid electrolytic capacitor not greater than 150V, by forming an anodic oxide film after hydration treatment and heat treatment of a metal, has been studied (see Japanese Patent Laying-Open No. 08-241832).

SUMMARY OF THE INVENTION

As described above, formation of the anodic oxide film through anodic oxidation is performed in complicated steps.

Here, the present inventors decided to review the anode element, in order to improve the conventionally used, complicated anodic oxidation method.

Initially, the present inventors studied whether the withstand voltage of the solid electrolytic capacitor and the Vt withstand voltage of the anodic oxide film correlate with each other. In the following, description will be given with reference to FIG. 3 showing relation between the withstand voltage of the solid electrolytic capacitor and the Vt withstand voltage of the barrier-type anodic oxide film. The abscissa in FIG. 3 represents a formation voltage in anodic oxidation, the left ordinate represents the withstand voltage of the solid electrolytic capacitor employing the anode element fabricated through anodic oxidation, and the right ordinate represents the Vt withstand voltage of the anodic oxide film formed through anodic oxidation. The Vt withstand voltage of the anodic oxide film increases in proportion to the formation voltage in anodic oxidation. Meanwhile, the withstand voltage of the solid electrolytic capacitor also increases similarly in proportion to the formation voltage.

Here, the Vt withstand voltage of the anodic oxide film and the withstand voltage of the solid electrolytic capacitor are compared with each other. Initially, when a formation voltage of 145V in anodic oxidation is applied, the withstand voltage of the solid electrolytic capacitor attains to 40V, which is not substantially different from the withstand voltage of the solid electrolytic capacitor when a formation voltage of 80V is applied. On the other hand, when the formation voltage of 145V in anodic oxidation is applied, the Vt withstand voltage attains to 160V, and when the formation voltage of 80V is applied, the Vt withstand voltage attains to approximately 80V. Namely, there is a great difference between these two cases.

Based on the result above, it was confirmed that there is no clear correlation between the withstand voltage of the solid electrolytic capacitor and the Vt withstand voltage of the anodic oxide film. Thus, it was suggested that the anodic oxide film does not necessarily have to be of the barrier-type, that is, the surface of the metal does not necessarily have to be coated to a uniform thickness.

Next, the present inventors manufactured a solid electrolytic capacitor employing as an anode element a metal having a surface not coated with an anodic oxide film, in order to study whether the anodic oxide film is effective for the anode element. FIG. 4 shows variation in the withstand voltage of the solid electrolytic capacitor when a constant current is applied to the manufactured solid electrolytic capacitor. The abscissa represents duration of application of the constant current and the ordinate represents the withstand voltage. As shown in FIG. 4, it was confirmed that there is almost no increase in the withstand voltage of the solid electrolytic capacitor even when the constant current is applied to the capacitor. Therefore, it was found that the anodic oxide film as the dielectric is effective in order to improve the withstand voltage of the solid electrolytic capacitor.

Thereafter, the present inventors studied whether heat treatment, that has conventionally been performed in anodic oxidation for forming the anodic oxide film, is necessary for lowering the leakage current of the solid electrolytic capacitor. FIG. 5 shows the leakage current in liquid and the leakage current of the solid electrolytic capacitor during anodic oxidation. The abscissa represents a temperature for heat treatment during anodic oxidation and the ordinate represents the leakage current. The reference temperature shown on the abscissa refers to a temperature for heat treatment (300° C.) that has conventionally been performed. The value of the "leakage current in liquid during anodic oxidation" in FIG. 5 refers to a value of the leakage current measured in liquid when a formation voltage of 55V was applied for anodic oxidation, and the "leakage current of the solid electrolytic capacitor" refers to a value of the leakage current measured when a voltage of 20V was applied to the solid electrolytic capacitor employing the anode element formed through heat treatment at the temperature shown on the abscissa. The leakage current in liquid decreases as the temperature for heat treatment increases. Accordingly, it was suggested that heat treatment in anodic oxidation is effective for lowering the leakage current in liquid. On the other hand, even if heat treatment is performed, variation in the leakage current of the solid electrolytic capacitor with the increase in the temperature for heat treatment was not observed. Therefore, it was suggested that heat treatment is not effective for lowering the leakage current of the solid electrolytic capacitor.

Japanese Patent Laying-Open No. 08-241832 discloses the invention allowing increase in capacitance when the withstand voltage of the solid electrolytic capacitor is equal to or lower than 150V, however, the step of forming a dielectric requires a large number of stages.

An object of the present invention is to provide an anode element having a coating layer as a high-quality dielectric layer formed, instead of a conventionally formed anodic oxide film. In addition, it is also an object of the present invention is to simplify the manufacturing step and improve reliability by employing the anode element in a solid electrolytic capacitor, for increasing a withstand voltage of the solid electrolytic capacitor.

The present invention relates to an anode element including a metal and a coating layer formed on a surface of the metal, the coating layer being composed of a hydrated oxide shown in chemical formula (1), a hydroxide shown in chemical formula (2), or a composite thereof:

$$MO_x \cdot yH_2O \qquad \text{chemical formula (1)}$$

where M represents a valve metal and x and y represent an integer or a decimal fraction from 1 to 6,

$$M(OH)_n \qquad \text{chemical formula (2)}$$

where M represents a valve metal and n represents an integer or a decimal fraction from 1 to 6.

In addition, in the anode element according to the present invention, preferably, an anodic oxide film is formed between the surface of the metal and the coating layer.

In addition, the present invention relates to a method of manufacturing the anode element described above, including the step of forming the coating layer on the surface of the metal by heating the metal in deionized water or in an aqueous solution containing a hydration accelerator agent or by subjecting the metal to deionized water steaming treatment.

Moreover, the present invention relates to a method of manufacturing the anode element described above, including the step of forming the coating layer on the surface of the metal by subjecting the metal to cathodic electrolysis in an aqueous solution containing phosphoric acid or a salt thereof, or silicic acid or a salt thereof.

Further, the present invention relates to a method of manufacturing the anode element described above, including the step of forming the coating layer on the surface of the metal by treating the metal with a solution containing an acid selected from the group consisting of phosphoric acid, oxalic acid and chromic acid and a metal selected from the group consisting of zinc, titanium and potassium or a salt thereof.

In addition, in the method of manufacturing the anode element according to the present invention, preferably, the coating layer is subjected to dehydration treatment Further, the present invention relates to a solid electrolytic capacitor including a solid electrolyte layer stacked on an anode element that includes a metal and a coating layer formed on a surface of the metal, the coating layer being composed of a hydrated oxide shown in chemical formula (1), a hydroxide shown in chemical formula (2), or a composite thereof:

$$MO_x \cdot yH_2O \qquad \text{chemical formula (1)}$$

where M represents a valve metal and x and y represent an integer or a decimal fraction from 1 to 6,

$$M(OH)_n \qquad \text{chemical formula (2)}$$

where M represents a valve metal and n represents an integer or a decimal fraction from 1 to 6.

Preferably, in the solid electrolytic capacitor according to the present invention, an anodic oxide film is formed between the surface of the metal and the coating layer.

In addition, preferably, a method of manufacturing a solid electrolytic capacitor according to the present invention is directed to a method of stacking a solid electrolyte layer on the anode element obtained with the method of manufacturing the anode element described above.

Moreover, preferably, in the solid electrolytic capacitor according to the present invention, a part of the anodic oxide film or entire anodic oxide film is subjected to hydration treatment.

Further, preferably, in the solid electrolytic capacitor according to the present invention, the coating layer having a thickness of at least 2 nm per solid electrolytic capacitor rated voltage 1V is formed, and a measurement value of a Vt withstand voltage of the coating layer in accordance with EIAJ RC-2364A is equal to or smaller than twice as large as the solid electrolytic capacitor rated voltage.

In addition, in the solid electrolytic capacitor according to the present invention, preferably, a cutting surface of the anode element or a coating layer defective portion is repaired with the coating layer.

Moreover, in the solid electrolytic capacitor according to the present invention, preferably, a rated voltage is set to at least 20V.

According to the present invention, even if a dielectric layer thickness is smaller than in the conventional product, an anode element having a dielectric with high performance can be provided.

In addition, the step of manufacturing the solid electrolytic capacitor can be simplified. Therefore, burdensome steps such as anodic oxidation and the like, with a shape of a solid electrolytic capacitor element, for repairing a defective portion of the dielectric (anodic oxide film) after cutting and working of the electrode can also be curtailed.

Moreover, as the coating layer does not have to have the conventional Vt withstand voltage, degree of freedom in selecting a type of the coating layer and means for generating the coating layer can significantly be improved. Consequently, not only simplification of the anode element fabrication step and improvement in reliability but also higher withstand voltage of the solid electrolytic capacitor employing the anode element (withstand voltage not lower than 100V) can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<Structure of Solid Electrolytic Capacitor>

The solid electrolytic capacitor according to the present invention may be any of the wound-type structure and the single-plate-type structure that have conventionally been manufactured.

Figure 1:
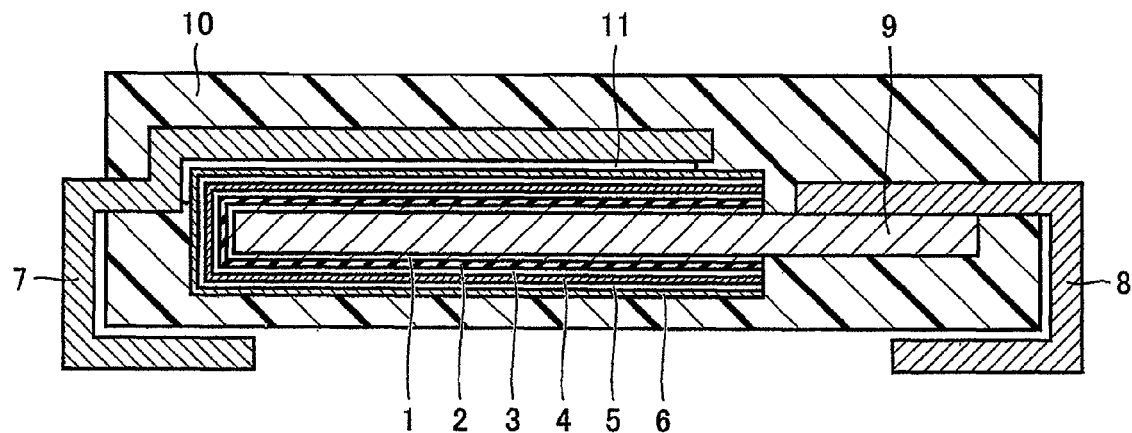
FIG. 1 is a diagram showing one embodiment of a single-plate-type solid electrolytic capacitor in the present invention.

In the following, an outline of the structure of the solid electrolytic capacitor of the single-plate-type according to the present invention shown in FIG. 1 will be described.

A coating layer 3 is formed on a surface of a metal 1 implemented by a valve metal, and an anodic oxide film 2 is formed as required between metal 1 and coating layer 3. Metal 1, coating layer 3 and anodic oxide film 2 form the anode element. A solid electrolyte layer 4, a carbon layer 5 and a silver paste layer 6 are successively stacked so as to cover the anode element.

In addition, an anode terminal 8 is connected to an anode lead member 9 placed on one end surface of metal 1, and silver paste layer 6 and a cathode terminal 7 are connected to each other by means of a conductive adhesive 11. It is noted that anode lead member 9 also serves as metal 1, in which case it is not necessary to form a layer of metal 1 in FIG. 1 on the surface of anode lead member 9.

Moreover, an exterior resin 10 such as epoxy resin molds the exterior.

<Anode Element>

The anode element of the present invention is structured in such a manner that coating layer 3 is stacked on the surface of metal 1 and anodic oxide film 2 is stacked as required. Coating layer 3 and anodic oxide film 2 serve as the dielectric. It is noted that anodic oxide film 2 and coating layer 3 form a two-layered structure, without mixed with each other.

Desirably, a valve metal such as aluminum, tantalum, niobium, titanium, and the like is employed as metal 1. In the present invention, particularly desirably, aluminum is employed.

<<Coating Layer>>

Coating layer 3 may be porous, and it does not have to be of the barrier-type, that is, the surface of the metal does not necessarily have to be coated completely to a uniform thickness. Though coating layer 3 is preferably formed on the surface of metal 1 to a uniform thickness, it does not necessarily have to be uniform. Coating layer 3 attains a function as the dielectric. Coating layer 3 is composed of a hydrated oxide or a hydroxide of a valve metal or a composite thereof, and its composition can be identified through FTIR (Fourier transform infrared spectrophotometer) analysis.

FTIR analysis of an anode element where aluminum is employed as metal 1 will be described. As to coating layer 3 formed on the surface of metal 1, through FTIR analysis, at least any one of absorption spectrum generated by stretching vibration of AlO—H bond observed around 3000-3700 $cm^{-1}$, absorption spectrum generated by stretching vibration of Al—OH bond observed around 1000-1050 $cm^{-1}$, and absorption spectrum generated by stretching vibration of OAl—O bond observed around 800-600 $cm^{-1}$ in representation of absorbance of spectrum of hydroxyl group is observed.

Alternatively, coating layer 3 can be identified also through X-ray photoelectron spectroscopy (XPS). Namely, coating layer 3 can be identified by measuring bond energy. For example, as to coating layer 3 in the anode element including aluminum as metal 1, it can be determined that coating layer 3 is composed of a hydrated oxide of aluminum if the bond energy on Al2p orbit attains to approximately 74.1 eV and that coating layer 3 is composed of a hydroxide of aluminum if the bond energy on Al2p orbit attains to approximately 74.6 eV.

Alternatively, X-ray analysis may be used for determination, as the hydroxide is amorphous.

Here in the present invention, the hydrated oxide refers to a substance shown in chemical formula (1) above, and the hydroxide refers to a substance shown in chemical formula (2) above. Specific examples of compounds of the hydrated oxides and the hydroxides include $Al_2O_3 \cdot H_2O$, $Al_2O_3 \cdot 3H_2O$, $Al(OH)_3$, $TaO_2 \cdot 2H_2O$, $Ta_2O_5 \cdot H_2O$, $Ti(OH)_2$, $Ti(OH)_3$, $Ti(OH)_4$, and the like, however, examples are not limited thereto.

Coating layer 3 preferably has a thickness not smaller than 1.5 nm per a rated voltage of 1V set in the solid electrolytic capacitor employing the anode element having coating layer 3 formed. A larger thickness is more effective for the withstand voltage of the solid electrolytic capacitor. On the other hand, since capacitance of the solid electrolytic capacitor is lowered as coating layer 3 has a larger thickness, a thickness not larger than 10.0 nm per a rated voltage of 1V is desirable.

<<Anodic Oxide Film>>

In the present invention, anodic oxide film 2 can be formed between metal 1 and coating layer 3. If aluminum is used as metal 1, mainly anodic oxide film 2 is composed of $Al_2O_3$.

Anodic oxide film 2 preferably has a thickness not smaller than 2.0 nm per a rated voltage of 1V set in the solid electrolytic capacitor employing the anode element having anodic oxide film 2 formed. A larger thickness is more effective for the withstand voltage of the solid electrolytic capacitor. On the other hand, since capacitance of the solid electrolytic capacitor is lowered as anodic oxide film 2 has a larger thickness, a thickness not larger than 10.0 nm per a rated voltage of 1V is desirable.

<Solid Electrolyte Layer>

In order to form a solid electrolytic capacitor of a small size and great capacity, an electron-conductive solid or a conductive polymer is used for solid electrolyte layer 4. Examples of the electron-conductive solid include manganese dioxide, 7,7,8,8-tetracyanoquinodimethane (TCNQ) complex salt and the like, and examples of the conductive polymer include polypyrrole, polythiophene, polyfuran, polyaniline, and the like.

<Method of Manufacturing the Solid Electrolytic Capacitor>

An outline of a method of manufacturing a solid electrolytic capacitor of the single-plate-type according to the present invention shown in FIG. 1 will be described by way of example.

Metal 1 is subjected to surface-area-expansion treatment such as etching, and thereafter to hydration treatment, chemical treatment or electrochemical treatment, thus forming coating layer 3. In addition, separately from forming of coating layer 3, anodic oxide film 2 is formed through anodic oxidation treatment. It is noted that anodic oxide film 2 may optionally be formed.

The anode element fabricated as above is immersed in a chemical polymerization liquid serving as a material for solid electrolyte layer 4, and thereafter taken out for heat treatment. Solid electrolyte layer 4 is thus formed in the anode element. Thereafter, in accordance with the well-known method, carbon layer 5 and silver paste layer 6 are successively formed, anode lead member 9 is placed on metal 1, anode terminal 8 is connected to anode lead member 9, and cathode terminal 7 is connected to silver paste layer 6 by means of conductive adhesive 11, thus manufacturing the solid electrolytic capacitor.

<<Pretreatment of Metal>>

In order to form the anode element, initially, metal 1 is subjected to pretreatment. Examples of valve metal 1 as a raw material for the anode element include aluminum, tantalum, niobium, titanium, and the like. In the present invention, aluminum is desirably used.

Pretreatment of the metal will be described hereinafter using an example in which aluminum foil is employed as metal 1. The aluminum foil is immersed in a liquid containing hydrochloric acid and sulfuric acid, AC electrolytic etching is prepared and performed for approximately 1 to 10 minutes, and surface-area-expansion treatment for forming irregularities on the surface of the aluminum foil is performed. Thus, the surface area of the aluminum foil is expanded and pretreatment of the metal is completed.

<<Forming of Coating Layer>>

Coating layer 3 is formed by subjecting metal 1, that has been subjected to the surface-area-expansion treatment, to heating treatment where the metal is immersed in boiling deionized water or an aqueous solution containing a hydration accelerator agent for 0.5 to 10 minutes (boiling) or a treatment where the metal is left in an atmosphere at 100 to 150° C. and at relative humidity of 100% for 1 to 60 minutes (deionized water steaming treatment). The aqueous solution containing a hydration accelerator agent refers to an aqueous solution containing 0.001 to 1 mass % salts or amines raising pH, and specific examples of the hydration accelerator agent include sodium tetraborate, triethanolamine, and the like.

Alternatively, coating layer 3 may be formed by subjecting metal 1 to cathodic electrolysis in an aqueous solution containing phosphoric acid or a salt thereof, or silicic acid or a salt thereof by 0.01 to 5.0 mass % for 0.5 to 10 minutes under the condition of 50 to 97° C. and current density of 1.0 to 100 $mA/cm^2$. Specific examples of phosphoric acid or the salt thereof include ammonium dihydrogen phosphate and the like, and specific examples of silicic acid or the salt thereof include potassium silicate and the like.

Alternatively, coating layer 3 may be formed by immersing metal 1 in a solution containing 0.1 to 10 mass % acid selected from the group consisting of phosphoric acid, oxalic acid and chromic acid, and 0.1 to 10 mass % metal selected from the group consisting of zinc, titanium and potassium or a salt thereof for 0.1 to 10 minutes at 30 to 70° C. Alternatively, coating layer 3 may be formed by spraying the solution to the surface of metal 1. Coating layer 3 formed by using the solution is composed of a mixture of a hydrated oxide and a hydroxide.

A particularly desirable method of forming coating layer 3 in the present invention is to subject metal 1 to immersion treatment for approximately 1 minute at 60 to 65° C. using the aqueous solution containing zinc phosphate.

In addition, preferably, coating layer 3 is further subjected to dehydration treatment by heating at 150 to 400° C. for 0.5 to 5 minutes, or the like.

In the method described above, complicated anodic oxidation for forming the anodic oxide film serving as the dielectric, that has conventionally been required, may not be performed.

<<Forming of the Anodic Oxide Film>>

Anodic oxide film 2 is generated by immersing metal 1 in a neutral electrolyte and applying an anode (+ positive) voltage thereto, as in the case of a conventional method. An aqueous solution of ammonium borate, ammonium phosphate, ammonium adipate, or the like is generally used as the electrolyte.

Specifically, anodic oxide film 2 is formed, for example, by immersing the anode element constituted of metal 1 or of metal 1 and coating layer 3 in an aqueous solution containing 0.1 to 15 mass % ammonium adipate, applying thereto a voltage approximately twice as great as the rated voltage at a temperature of 30 to 90° C., and holding the anode element for approximately 10 to 30 minutes. Anodic oxide film 2 may be formed before or after coating layer 3 is formed. Anodic oxide film 2 may be formed after coating layer 3 is formed, because oxygen ions migrate, during anodic oxidation, through coating layer 3 composed of a hydrated oxide and anodic oxide film 2 is formed between the surface of metal 1 and coating layer 3.

Alternatively, in the solid electrolytic capacitor as in the present invention, non-barrier-type anodic oxide film 2 may be formed by performing anodic oxidation where metal 1 is immersed in an aqueous solution containing 0.1 to 15 mass % sulfuric acid, oxalic acid or phosphoric acid and a voltage of 10 to 30V is applied at a temperature of 10 to 30° C. for 3 to 30 minutes. In the present invention, even non-barrier-type anodic oxide film 2 can attain a function equivalent to the conventional barrier-type dielectric (anodic oxide film).

Alternatively, anodic oxide film 2 may further be subjected to hydration treatment by immersing metal 1 in boiling deionized water or an aqueous solution containing a hydration accelerator agent.

The solid electrolytic capacitor employing the anode element having non-barrier-type anodic oxide film 2 of the present invention can attain performance similar to that of the solid electrolytic capacitor employing the anode element having barrier-type anodic oxide film 2, because coating layer 3 is formed on the surface of metal 1.

<<Forming of the Solid Electrolyte Layer>>

The anode element is immersed in a chemical polymerization liquid containing a monomer serving as a raw material for the conductive polymer to compose solid electrolyte layer 4 as a result of chemical polymerization and an oxidizer, for monomer thermochemical polymerization at 20 to 60° C.

In addition, such a function and effect to lower ESR (Equivalent Series Resistance) as a completed solid electrolytic capacitor product is obtained by adding a silane coupler to the chemical polymerization liquid in thermochemical polymerization so as to improve adhesion between coating layer 3 and conductive polymer layer 4.

For example, a chemical polymerization liquid obtained by mixing 3,4-ethylenedioxythiophene as a monomer composing the conductive polymer as a result of oxidation polymerization, iron (III) para toluenesulfonate as the oxidizer, isopropyl alcohol as a diluent at a weight ratio of 1:3:4, and adding thereto 0.2 to 4 mass % silane coupler containing γ-glycidoxypropyltrimethoxysilane or the like is prepared.

<Method of Manufacturing the Wound-Type Solid Electrolytic Capacitor>

Figure 2:
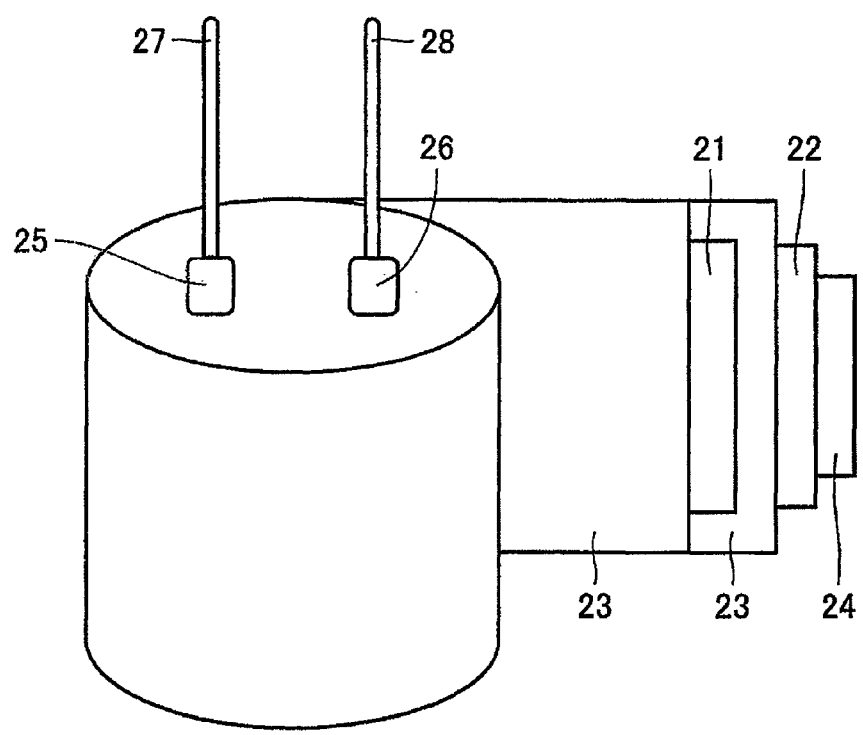
FIG. 2 is a diagram showing one embodiment of a wound-type solid electrolytic capacitor in the present invention.
Figure 3:
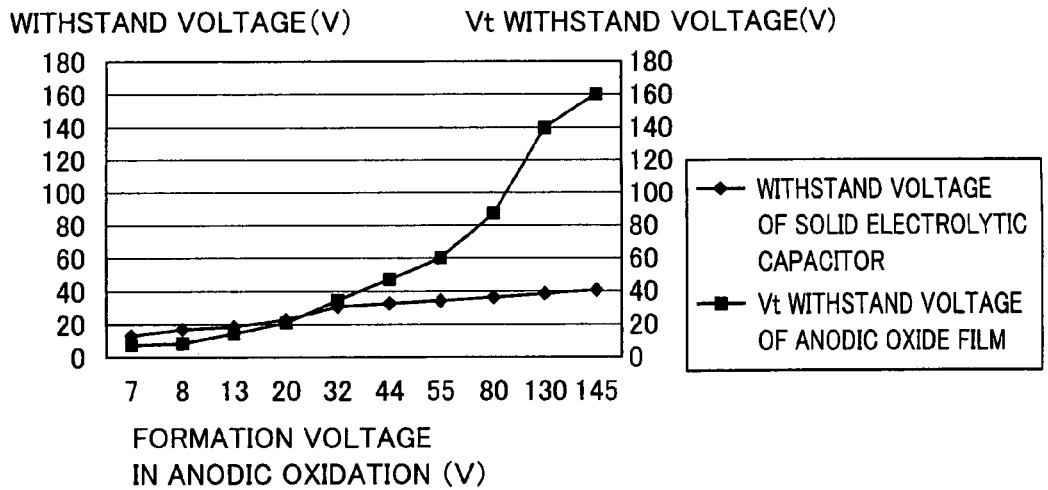
FIG. 3 is a graph showing relation between a withstand voltage of a solid electrolytic capacitor and a Vt withstand voltage of a barrier-type anodic oxide film.
Figure 4:
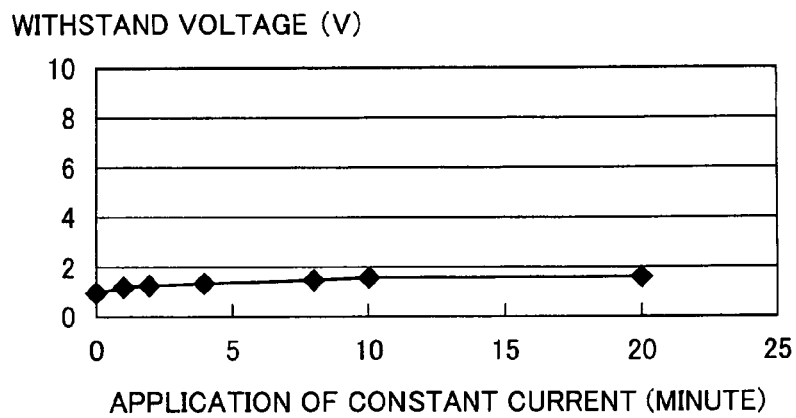
FIG. 4 is a graph showing a result of measurement of a withstand voltage of a solid electrolytic capacitor, obtained by applying a constant current to the solid electrolytic capacitor employing as an anode element a metal not having a coating layer formed on its surface.
Figure 5:
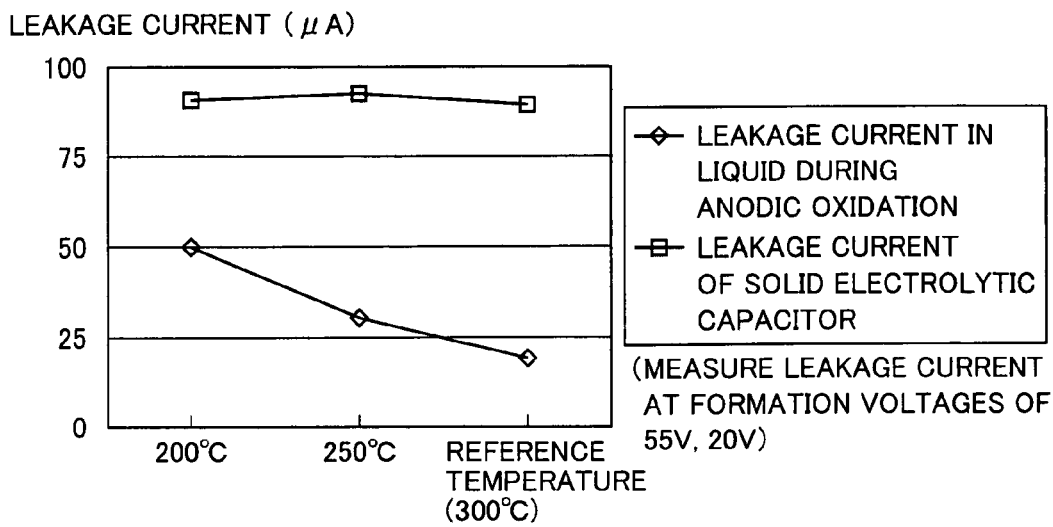
FIG. 5 is a graph showing a leakage current in liquid and a leakage current of the solid electrolytic capacitor.

An outline of a method of manufacturing the wound-type solid electrolytic capacitor according to the present invention shown in FIG. 2 will be described by way of example.

An anode lead terminal 27 is attached to an anode element 21 having the anodic oxide film and the coating layer formed on the surface, by means of an anode lead tab 25. Thereafter, a cathode lead terminal 28 is attached to a cathode foil 22 by means of a cathode lead tab 26. Then, anode element 21 and cathode foil 22 are rolled with a separator paper 23 being interposed, and held with a tape 24. A wound-type stack structure is formed in the above-described steps. Thereafter, the stack structure is impregnated with the chemical polymerization liquid for chemical polymerization, thereby forming the solid electrolyte layer in the stack structure. This structure serves as a basic skeleton of a solid electrolytic capacitor element.

Thereafter, the solid electrolytic capacitor element is stored in a casing in a shape of a cylinder with bottom made of aluminum, the opening thereof is sealed with epoxy resin serving as a sealing material, and the solid electrolytic capacitor element is subjected to aging treatment. A desired solid electrolytic capacitor is thus completed. A butyl rubber or the like of low permeability and high heat resistance may be employed instead of the epoxy resin as the sealing material.

Meanwhile, in repairing a cutting surface of the anode element or a coating layer defective portion of the wound-type solid electrolytic capacitor, the solid electrolytic capacitor element is immersed in deionized water at a temperature of 95° C. or higher for 5 minutes. By performing this treatment, the coating layer can be repaired in a simplified step.

<Performance of the Solid Electrolytic Capacitor>

In the solid electrolytic capacitor of the present invention, coating layer 3 of the employed anode element preferably has a thickness of 2 nm or greater per a rated voltage of 1V set in the solid electrolytic capacitor. In addition, the measurement value of the Vt withstand voltage of coating layer 3 is preferably not larger than twice as great as the rated voltage of the solid electrolytic capacitor. In measuring the Vt withstand voltage in the present invention, specifically, the anode element is immersed in an SUS304 measurement cell containing 150 g ammonium adipate and 100 mL deionized water, a current of 2 mA is applied, and after a value defined by the rated voltage is reached, a voltage for three minutes is measured.

Here, there are two types of phenomena exhibited when a voltage up to the withstand voltage is applied to the solid electrolytic capacitor. One phenomenon is observed when the dielectric layer has a small thickness (1 to 100 nm), where a current flows out in such a manner as exceeding the threshold and original state is recovered when the applied voltage is lowered. Another phenomenon is observed when the dielectric layer has a large thickness (100 to 1000 nm), where intense breakdown leading to short-circuiting occurs and irreparable state is caused.

As to the withstand voltages of the solid electrolytic capacitors according to the present invention and the conventional example, however, it was assumed that, in a voltage range where the dielectric of the anode element attains a normal dielectric function, voltage-current relation basically follows Richardson-Dushman field emission equation (equation (1)), and the voltage value at which voltage-current gradient (equation (2)) starts to increase was set as the value of the withstand voltage. In measuring voltage-current relation of the solid electrolytic capacitor, a current one minute after a voltage is applied to the single-plate-type solid electrolytic capacitor in 1V-step using a DC regulated power supply was plotted.

Figure 6:
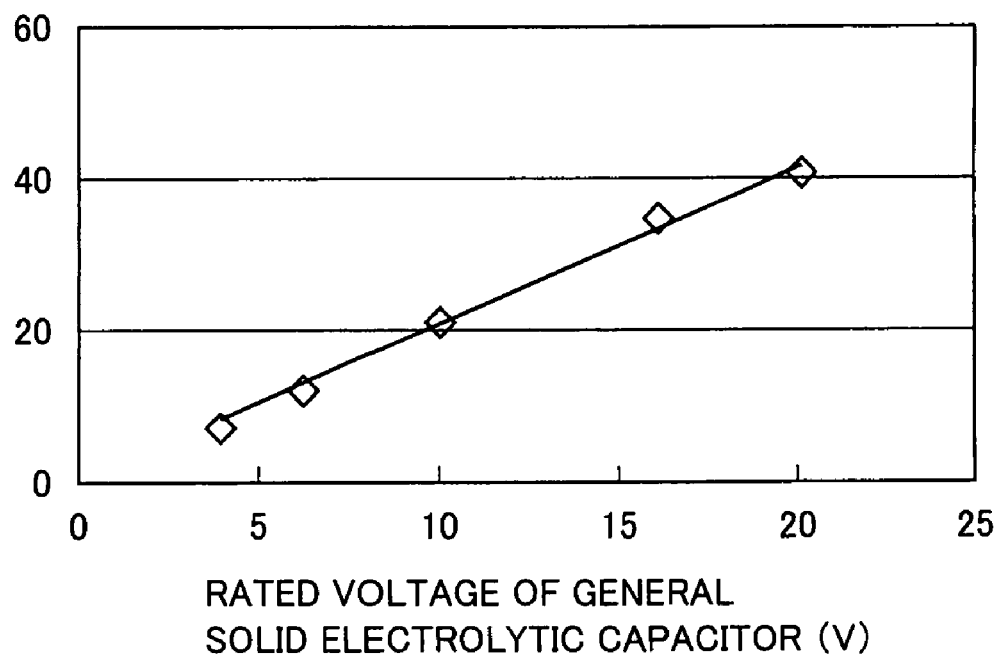
FIG. 6 is a graph showing relation between a rated voltage of a general solid electrolytic capacitor (conventional product) and a withstand voltage of the general solid electrolytic capacitor.

Initially, this measurement method was used to find the value of the withstand voltage of a general solid electrolytic capacitor (hereinafter, also referred to as a conventional product). In FIG. 6, the abscissa represents the rated voltage of the general solid electrolytic capacitor and the ordinate represents the withstand voltage of the general solid electrolytic capacitor. It can be seen in FIG. 6 that the withstand voltage of the general solid electrolytic capacitor is approximately twice as large as the rated voltage of the general solid electrolytic capacitor. In addition, in order to set the withstand voltage of the solid electrolytic capacitor according to the conventional product to 40V or greater, the thickness of the dielectric layer (anodic oxide film) should be adjusted, which requires time and trouble. Accordingly, the rated voltage smaller than 20V has been mainstream. In contrast, as the withstand voltage of the solid electrolytic capacitor according to the present invention can readily be improved as compared with the conventional product, the rated voltage not smaller than 20V can be set.

Figure 7:
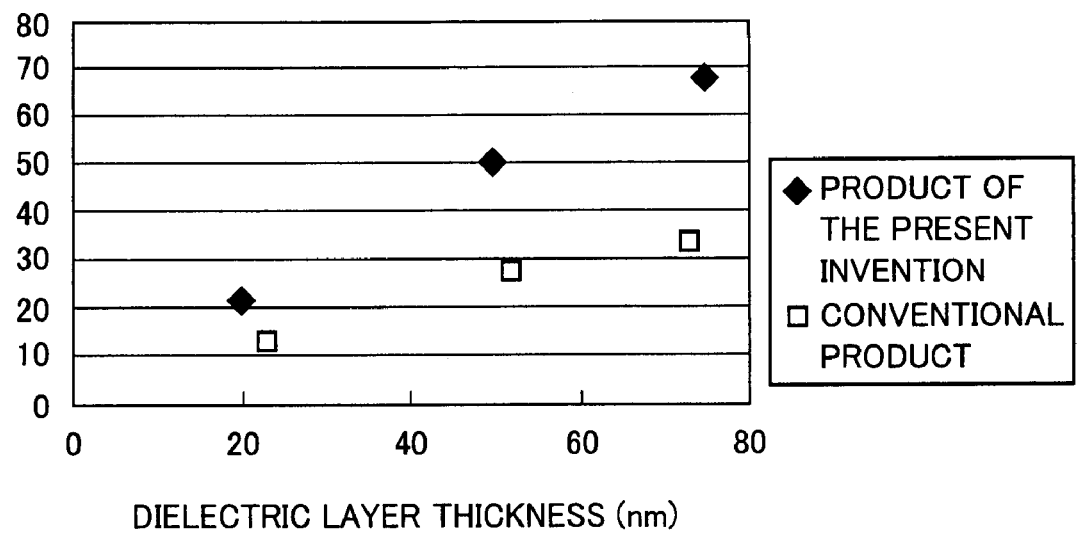
FIG. 7 is a graph showing relation of a withstand voltage of a solid electrolytic capacitor according to a product of the present invention and a withstand voltage of a solid electrolytic capacitor according to a conventional product, with a dielectric layer thickness.

FIG. 7 shows the withstand voltage of the solid electrolytic capacitor with varied thicknesses of the dielectric layer of the anode element. The abscissa represents the thickness of the dielectric layer of the anode element and the ordinate represents the withstand voltage of the solid electrolytic capacitor. Initially, the withstand voltage of the solid electrolytic capacitor of the product of the present invention (metal of the anode element: aluminum, coating layer: $Al_2O_3 \cdot nH_2O$ (n represents an integer or a decimal fraction from 1 to 3) and the withstand voltage of the solid electrolytic capacitor of the conventional product with the identical thickness of the dielectric layer are compared. If the dielectric layer (coating layer) of the product of the present invention has the thickness similar to that of the dielectric layer (anodic oxide film) of the conventional product, it is shown that the withstand voltage of the product of the present invention is approximately more than twice as great as the withstand voltage of the conventional product. Namely, even if the coating layer serving as the dielectric of the present invention has a thickness smaller than the dielectric layer thickness of the conventional product, it is shown that a higher withstand voltage of the solid electrolytic capacitor can be set.

When attention is paid to the withstand voltage of each solid electrolytic capacitor in the case where the dielectric layer thickness in the product of the present invention and the conventional product is set, for example, to approximately 75 nm, the following result is shown. The withstand voltage of the conventional product is approximately 32V. Here, the dielectric layer (anodic oxide film) was formed through complicated anodic oxidation step. In contrast, when the dielectric layer (coating layer) of the product of the present invention is set to approximately 75 nm, the withstand voltage is 68V. In the present invention, in order to form a dielectric layer (coating layer), for example, to 75 nm, it is only necessary to perform the step shown in Example 1 which will be described later (boiling the metal in deionized water for one minute). In general, in the solid electrolytic capacitor of the product of the present invention, the withstand voltage higher than that of the conventional product can readily be obtained and a higher rated voltage can be set.

$$J = AT^2 e^{\frac{-w}{kt}} \quad \text{Equation 1}$$

where J represents current density, T represents a temperature of the metal, W represents a work function, k represents a Boltzmann constant, and A represents a Richardson constant.

$$\log I/\sqrt{V} \quad \text{Equation 2}$$

where I represents a current and V represents a voltage.

EXAMPLES

Example 1

A commercially available etched foil for aluminum electrolytic capacitor electrode made of a valve metal (surface-area-expansion rate of approximately 30 times, the anodic oxide film not formed; hereinafter, referred to as aluminum foil) was cut into a size of 10 mm×10 mm. The cut aluminum foil was immersed in boiling deionized water for one minute, thereby forming a coating layer composed of a hydrated oxide on the surface thereof.

As a result of identification of the hydrated oxide through FTIR analysis, absorption spectrum generated by stretching vibration of AlO—H bond observed around 3500 cm$^{-1}$ and absorption spectrum generated by stretching vibration of Al—OH bond observed around 1100 cm$^{-1}$ were observed. Presence of the coating layer composed of a hydrated oxide of Al on the surface of the aluminum foil was thus confirmed. In addition, it was also confirmed in a cross-sectional photograph of the coating layer by a scanning electron microscope that the coating layer has a thickness of approximately 105 mm.

Thereafter, using the anode element constituted of the aluminum foil and the coating layer formed on the surface thereof, the single-plate-type solid electrolytic capacitor was manufactured. The anode element was subjected to repeated treatment step of immersion in a 1-butanol solution containing 3,4-ethylenedioxythiophene and iron (III) p-toluenesulfonate used as a dopant for 5 minutes, followed by heat treatment for 30 minutes in an atmosphere at 160° C. Through this step (chemical oxidation polymerization method), the solid electrolyte layer was stacked on the anode element. The carbon layer and the silver paste layer were successively formed on the solid electrolyte layer, the anode terminal was attached to the anode element using resistance welding, and the silver paste layer and the cathode terminal were connected to each other by means of the conductive adhesive.

Then, a current of 2 mA was applied between the anode element and the cathode terminal and the withstand voltage was measured. Here, the withstand voltage refers to a voltage value at which the voltage stops increasing after a constant current is applied to increase the voltage. Table 1 shows the result of measurement.

Example 2

The aluminum foil cut and etched with the same method as in Example 1 was immersed in boiling deionized water for 10 minutes, to form a coating layer composed of a hydrated oxide on the surface of the aluminum foil. It was confirmed with FTIR analysis as in Example 1 that the coating layer in the present example is composed of the hydrated oxide. In addition, it was confirmed in a cross-sectional photograph of the coating layer by a scanning electron microscope that the coating layer has a thickness of approximately 210 nm. Thereafter, using the anode element constituted of the aluminum foil and the coating layer formed on the surface thereof, the solid electrolytic capacitor was manufactured using the same method as in Example 1 and the withstand voltage thereof was measured. Table 1 shows the result of measurement.

Example 3

The aluminum foil cut and etched with the same method as in Example 1 was immersed in a triethanolamine 0.03 g/L aqueous solution at 90° C. for 3 minutes, to form a coating layer composed of a hydrated oxide on the surface of the aluminum foil. It was confirmed with FTIR analysis as in Example 1 that the coating layer in the present example is composed of the hydrated oxide. In addition, it was confirmed in a cross-sectional photograph of the coating layer by a scanning electron microscope that the coating layer has a thickness of approximately 135 nm. Thereafter, using the anode element constituted of the aluminum foil and the coating layer formed on the surface thereof, the solid electrolytic capacitor was manufactured using the same method as in Example 1 and the withstand voltage thereof was measured. Table 1 shows the result of measurement.

Example 4

The aluminum foil cut and etched with the same method as in Example 1 was left in an atmosphere at 150° C. and at relative humidity of 100% for 30 minutes, to form a coating layer composed of a hydrated oxide on the surface of the aluminum foil. It was confirmed with FTIR analysis as in Example 1 that the coating layer in the present example is composed of the hydrated oxide. In addition, it was confirmed in a cross-sectional photograph of the coating layer by a scanning electron microscope that the coating layer has a thickness of approximately 70 nm. Thereafter, using the anode element constituted of the aluminum foil and the coating layer formed on the surface thereof, the solid electrolytic capacitor was manufactured using the same method as in Example 1 and the withstand voltage thereof was measured. Table 1 shows the result of measurement.

Example 5

The aluminum foil cut and etched with the same method as in Example 1 was immersed in a sodium tetraborate 1.0 g/L aqueous solution at 100° C. for 3 minutes, to form a coating layer composed of a composite of a hydrated oxide and a hydroxide on the surface of the aluminum foil. It was confirmed with FTIR analysis as in Example 1 that the coating layer in the present example is composed of the composite of the hydrated oxide and the hydroxide. In addition, it was confirmed in a cross-sectional photograph of the coating layer by a scanning electron microscope that the coating layer has a thickness of approximately 140 nm. Thereafter, using the anode element constituted of the aluminum foil and the coating layer formed on the surface thereof, the solid electrolytic capacitor was manufactured using the same method as in Example 1 and the withstand voltage thereof was measured. Table 1 shows the result of measurement.

Example 6

The aluminum foil cut and etched with the same method as in Example 1 was immersed in an ammonium dihydrogen phosphate 1.0 g/L aqueous solution at 90° C. and cathodic electrolysis using a current of 20 mA/cm$^2$ was performed for 3 minutes, to form a coating layer on the surface of the aluminum foil. It was confirmed with FTIR analysis as in Example 1 that the coating layer in the present example is composed of a composite of a hydrated oxide and a hydroxide. In addition, it was confirmed in a cross-sectional photograph of the coating layer by a scanning electron microscope that the coating layer has a thickness of approximately 115 nm. Thereafter, using the anode element constituted of the aluminum foil and the coating layer formed on the surface thereof, the solid electrolytic capacitor was manufactured using the same method as in Example 1 and the withstand voltage thereof was measured. Table 1 shows the result of measurement.

Example 7

The aluminum foil cut and etched with the same method as in Example 1 was immersed in a commercially available zinc phosphate formation treatment liquid (concentration $Zn^{3+}$: 0.7%, $PO_4$: 1.0%, temperature: 60° C.) for 60 seconds, to form a coating layer on the surface of the aluminum foil. The coating layer was composed of hopeite. In addition, it was confirmed in a cross-sectional photograph of the coating layer by a scanning electron microscope that the coating layer has a thickness of approximately 130 nm. Thereafter, using the anode element constituted of the aluminum foil and the coating layer formed on the surface thereof, the solid electrolytic capacitor was manufactured using the same method as in Example 1 and the withstand voltage thereof was measured. Table 1 shows the result of measurement.

Comparative Example 1

The aluminum foil cut and etched with the same method as in Example 1 was subjected to anodic oxidation at a voltage up to 100V (anodic oxidation voltage for rated voltage 35V) in an ammonium adipate 10 g/L aqueous solution at 85° C. and held for 15 minutes. Thereafter, the aluminum foil was subjected to heat treatment at 450° C. for 2 minutes, a voltage of 100V was applied thereto again in the aqueous solution described above, and the aluminum foil was held for 15 minutes (depolarization treatment). The anodic oxide film was formed on the surface of the aluminum foil through the treatment above. As a result of measurement of the thickness of the anodic oxide film as in Example 1, the thickness was approximately 110 nm. Thereafter, using the anode element constituted of the aluminum foil and the anodic oxide film formed on the surface thereof, the solid electrolytic capacitor was manufactured using the same method as in Example 1 and the withstand voltage thereof was measured. Table 1 shows the result of measurement.

Comparative Example 2

The aluminum foil cut and etched with the same method as in Example 1 was subjected to anodic oxidation at a voltage up to 250V in a boric acid 100 g/L aqueous solution at 85° C. and held for 15 minutes. Thereafter, the aluminum foil was subjected to heat treatment at 450° C. for 2 minutes, a voltage of 250V was applied thereto again in the aqueous solution described above, and the aluminum foil was held for 15 minutes. The anodic oxide film was formed on the surface of the aluminum foil through the treatment above. As a result of measurement of the thickness of the anodic oxide film as in Example 1, the thickness was approximately 210 nm. Thereafter, using the anode element constituted of the aluminum foil and the anodic oxide film formed on the surface thereof, the solid electrolytic capacitor was manufactured using the same method as in Example 1 and the withstand voltage thereof was measured. Table 1 shows the result of measurement.

TABLE 1

|  | Condition for Generating Dielectric Layer | Dielectric Layer Thickness (nm) | Withstand Voltage (V) |
|---|---|---|---|
| Example 1 | Boiled in deionized water for 1 minute | 105 | 111 |
| Example 2 | Boiled in deionized water for 10 minutes | 210 | 182 |

TABLE 1-continued

|  | Condition for Generating Dielectric Layer | Dielectric Layer Thickness (nm) | Withstand Voltage (V) |
|---|---|---|---|
| Example 3 | Immersed in triethanolamine 0.03 g/L at 90° C. for 3 minutes | 135 | 121 |
| Example 4 | Steamed with deionized water Relative humidity 100%, 150° C. for 30 minutes | 70 | 62 |
| Example 5 | Immersed in sodium tetraborate 1.0 g/L at 100° C. for 3 minutes | 140 | 133 |
| Example 6 | Cathodic electrolysis in ammonium dihydrogen phosphate 1.0 g/L at 90° C. at 20 mA/cm$^2$ for 3 minutes | 115 | 110 |
| Example 7 | Zinc phosphate formation treatment (hopeite) Commercially available formation treatment bath (Zn: 0.7%, PO$_4$: 1.0%), 60 seconds | 130 | 83 |
| Comparative Example 1 | Barrier-type anodic oxide film Depolarization treatment performed Ammonium adipate 10 g/L 100 V | 110 | 58 |
| Comparative Example 2 | Barrier-type anodic oxide film Boric acid 100 g/L 250 V | 210 | 83 |

(Comparison of the Result)

It is assumed that both of the coating layer and the anodic oxide film are "dielectric layers".

As shown in Table 1, it was found that there is not much difference in the dielectric layer thickness between Example 1 and Comparative Example 1, however, the withstand voltage of the solid electrolytic capacitor in Example 1 is almost twice as large as that in Comparative Example 1. Therefore, in the case that the electrode is cut and worked to form the capacitor element, burdensome steps such as repairing of the dielectric by anodic oxidation, with the shape of the solid electrolytic capacitor element, can be replaced with simple immersion in deionized water.

In addition, as a result of study on a type of the coating layer well adapted in terms of performance and efficiency as well as on applications thereof, it was found that the withstand voltage of the solid electrolytic capacitor can be improved by employing as the dielectric the coating layer of the present invention, rather than the generally used, barrier-type anodic oxide film.

Further, by comparing the examples, it was found that degree of freedom in selecting a type of the coating layer and means for generating the coating layer can significantly be improved.

Although the present invention has been described and illustrated in detail, it is clearly understood that the same is by way of illustration and example only and is not to be of way of limitation, the spirit and scope of the present invention being limited only by the terms of the appended claims.

What is claimed is:

1. An anode element comprising:
a metal; and
a coating layer formed on a surface of the metal, said metal and said coating layer being adjacent to each other, without an anodic oxide film being interposed between said metal and said coating layer;
said coating layer being a composite;
wherein said composite is composed of
hydrated oxide shown as

  chemical formula (1)

where M represents a valve metal and x and y represent an integer or a decimal fraction from 1 to 6, and
a hydroxide shown as

  chemical formula (2)

where M represents a valve metal and n represents an integer or a decimal fraction from 1 to 6.

2. A method of manufacturing the anode element according to claim 1, comprising the step of forming the coating layer on the surface of the metal by heating the metal in deionized water or in an aqueous solution containing a hydration accelerator agent or by subjecting the metal to deionized water steaming treatment.

3. The method of manufacturing the anode element according to claim 2, wherein
said coating layer is subjected to dehydration treatment.

4. A method of manufacturing a solid electrolytic capacitor, comprising the step of stacking a solid electrolyte layer on the anode element obtained with the method of manufacturing the anode element according to claim 2.

5. A method of manufacturing the anode element according to claim 1, comprising the step of forming the coating layer on the surface of the metal by subjecting the metal to cathodic electrolysis in an aqueous solution containing phosphoric acid or a salt thereof, or silicic acid or a salt thereof.

6. The method of manufacturing the anode element according to claim 5, wherein
said coating layer is subjected to dehydration treatment.

7. A method of manufacturing a solid electrolytic capacitor, comprising the step of stacking a solid electrolyte layer on the anode element obtained with the method of manufacturing the anode element according to claim 5.

8. A method of manufacturing the anode element according to claim 1, comprising the step of forming the coating layer on the surface of the metal by treating the metal with a solution containing an acid selected from the group consisting of phosphoric acid, oxalic acid and chromic acid and a metal selected from the group consisting of zinc, titanium and potassium or a salt thereof.

9. The method of manufacturing the anode element according to claim 8, wherein
said coating layer is subjected to dehydration treatment.

10. A method of manufacturing a solid electrolytic capacitor, comprising the step of stacking a solid electrolyte layer on the anode element obtained with the method of manufacturing the anode element according to claim 8.

11. A solid electrolytic capacitor comprising a solid electrolyte layer stacked on an anode element including a metal and a coating layer formed on a surface of the metal, said metal and said coating layer being adjacent to each other, without an anodic oxide film being interposed between said metal and said coating layer;
said coating layer being composed of
a hydrated oxide shown as $$MO_x \cdot yH_2O \quad \text{chemical formula (1)}$$

where M represents a valve metal and x and y represent an integer or a decimal fraction from 1 to 6,
a hydroxide shown as $$M(OH)_n \quad \text{chemical formula (2)}$$

where M represents a valve metal and n represents an integer or a decimal fraction from 1 to 6,
or a composite thereof.

12. The solid electrolytic capacitor according to claim 11, wherein
said coating layer having a thickness of at least 2 nm per solid electrolytic capacitor rated voltage 1V is formed, and
a measurement value of a Vt withstand voltage of said coating layer in accordance with EIAJ RC-2364A is equal to or smaller than twice as large as the solid electrolytic capacitor rated voltage.

13. The solid electrolytic capacitor according to claim 11, wherein
a cutting surface of the anode element or a coating layer defective portion is repaired with the coating layer.

14. The solid electrolytic capacitor according to claim 11, wherein
a rated voltage is set to at least 20V.

* * * * *